UNITED STATES PATENT OFFICE.

CHARLES H. KENDRICK, OF WINCHESTER, NEW HAMPSHIRE.

PROCESS OF PURIFYING WATER.

SPECIFICATION forming part of Letters Patent No. 566,324, dated August 25, 1896.

Application filed October 9, 1895. Serial No. 565,163. (No specimens.)

*To all whom it may concern:*

Be it known that I, CHARLES H. KENDRICK, a citizen of the United States, and a resident of Winchester, in the county of Cheshire and State of New Hampshire, have invented certain new and useful Improvements in Processes of Purifying Water, of which the following is a specification.

My invention relates to the purification of water; and the object of my invention is to provide a coagulant to the action of which the water to be purified can be directly submitted without requiring the use of any apparatus to regulate the flow of the coagulant to the water, and which shall be free from the objections often made to the use of certain chemicals in clarifying potable water. I accomplish this object by using as a coagulant a comminuted alloy of aluminium.

It is known that aluminium hydroxid has the property of coagulating the animal and vegetable matters held in solution or in suspension, and the mineral matters held in suspension in impure water, and of forming with them an insoluble coagulum or precipitate, which may then be removed from the water by sedimentation or filtration. I have discovered that this aluminium hydroxid can be produced by subjecting water to the action of a comminuted alloy of aluminium. Pure aluminium will oxidize to some extent in hard water; but for the purification of soft water I have found that the presence of some other metal is necessary to render the aluminium readily soluble. A mixture of chips of aluminium with those of another metal will act as a coagulant to a limited extent; but the action of a comminuted alloy is much superior.

Any metal which is electronegative to aluminium may be used in forming the alloy. In practice I use tin because it is perfectly innocuous.

The aluminium and tin may be combined in various proportions. My researches have shown that the proportion of twenty parts of aluminium to one part of tin accomplishes the best results.

The water to be purified may first be passed through a bed of the comminuted alloy above described and then through a filter, or the comminuted alloy may be placed within the filter itself and mixed with the sand or other substance composing the filter-bed.

I am aware that the salts of aluminium have been used as a coagulant, and that aluminium hydroxid has been produced by immersing in water plates of aluminium composing the anodes of electric circuits, and therefore I do not claim such uses of aluminium.

Having thus described my invention, what I claim as new, and desire to secure by Letters Patent of the United States, is—

1. The process of purifying water which consists in subjecting it to the action of a coagulant composed of a comminuted alloy of aluminium; and then separating the coagulum from the water, substantially as described.

2. The process of purifying water which consists in passing it through a filter-bed composed of granular material with which is mixed a coagulant composed of a comminuted alloy of aluminium, substantially as described.

Signed at Newark, in the county of Essex and State of New Jersey, this 8th day of October, A. D. 1895.

CHARLES H. KENDRICK.

Witnesses:
ERNEST F. KEER,
RALPH W. HYATT.